UNITED STATES PATENT OFFICE.

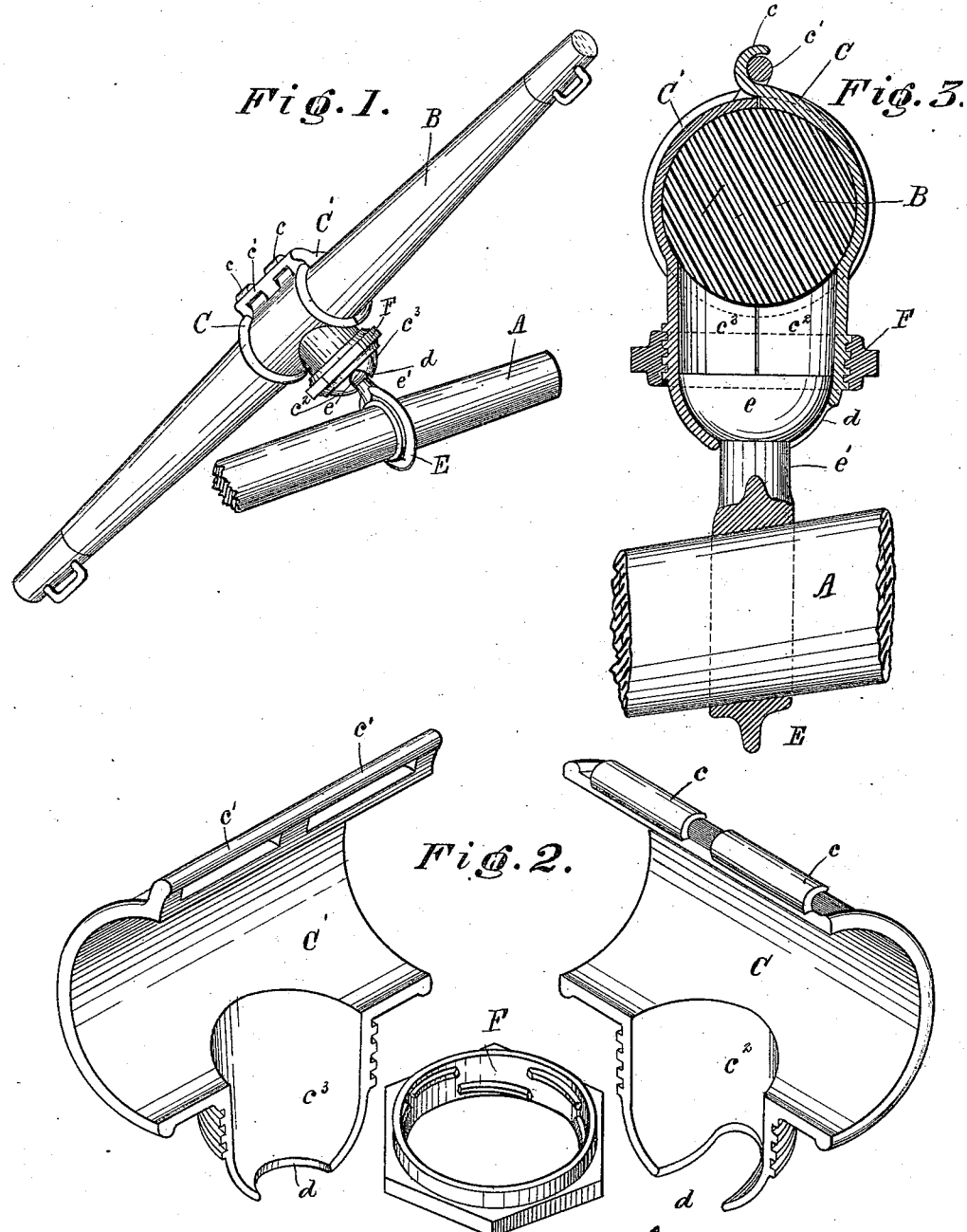

LOUIS BUOB, JR., OF CINCINNATI, OHIO.

NECK-YOKE COUPLING.

SPECIFICATION forming part of Letters Patent No. 430,267, dated June 17, 1890.

Application filed March 31, 1890. Serial No. 346,014. (No model.)

*To all whom it may concern:*

Be it known that I, LOUIS BUOB, Jr., a citizen of the United States, residing at Cincinnati, county of Hamilton, and State of Ohio, have invented a certain new and useful Improvement in Neck-Yoke Couplings, of which the following is a specification.

The object of my invention is to provide a neck-yoke coupling which can be economically manufactured and be readily applied to and removed from the bar and which will adjust itself to the various positions occupied by the bar; and the invention consists in the construction and arrangement of parts herein-after pointed out.

In the drawings, Figure 1 is a perspective view showing my improved coupling. Fig. 2 is a perspective view of the socket and nut. Fig. 3 is a transverse view of the coupling, partly in section.

A is the pole of the vehicle; B, the bar of the yoke.

C C' are the two parts of a separable sleeve, the part C being provided at its upper end with knuckles $c$, turned outwardly and taking partly around corresponding pintles $c'$ on the upper end of the part C', thus forming a separable connection. These sleeve-sections take around the bar B and are extended at the lower edge, as at $c^2$ and $c^3$, to form a socket in which a ball $e$ plays, thus forming a ball-and-socket joint. The socket is provided with a slot $d$ at its lower end extending rearward transversely of the coupling. The exterior of the socket is threaded, forming the shaft of a screw, over which the nut F takes. This screw is slightly coned, the nut being of corresponding shape, so that as the nut is forced into position an increasing pressure will be exerted on the bar of the yoke, thus insuring a firm hold of the coupling on the bar.

E is a ring or band adapted to take over the pole of the vehicle and preferably having its bore inclined upwardly from front to rear. The object of this is to enable the coupling to occupy its normal working position without causing a twisting strain upon the ring or band. This ring E and the ball $e$ are connected by a shank $e'$ and are preferably cast in one piece.

It will be seen that by my improvement the number of parts which go to constitute a coupling of this kind have been reduced to the minimum, and that they can all be cast, thus insuring economy of manufacture. My coupling can also be readily removed from one bar and placed upon another.

I claim—

1. The combination, in a neck-yoke coupling, of a divided sleeve provided with a divided externally-threaded socket, a ring provided with a ball adapted to take into the socket, and a nut adapted to take over the socket, substantially as and for the purpose specified.

2. The combination, in a neck-yoke coupling, of a sleeve provided with a divided externally-threaded coned socket, a ring provided with a ball adapted to take into the socket, and a nut adapted to take over the socket, substantially as and for the purpose specified.

3. The combination, in a neck-yoke coupling, of a ring carrying the ball $e$, the divided sleeve-sections C and C', having the knuckles $c$ and pintles $c'$, and the divided socket $c^2$ $c^3$, with the nut F, substantially as and for the purpose specified.

LOUIS BUOB, JR.

Witnesses:
AUGUST F. HERBSLEB,
J. N. RAMSEY.